(No Model.)
S. W. TAYLOR.
VELOCIPEDE.
No. 309,109.  Patented Dec. 9, 1884.
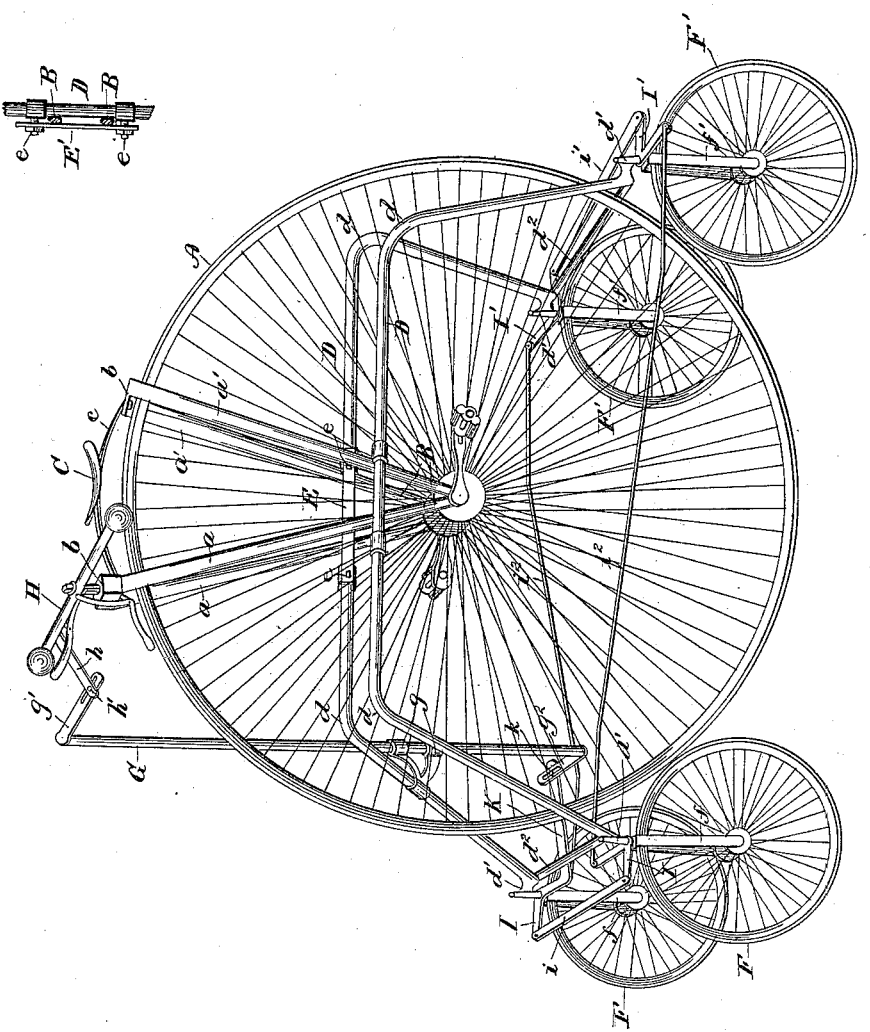
WITNESSES
Chas. R. Burr
H. Hollerith
INVENTOR
Sydney W. Taylor
by Franck D. Johns
Attorney

UNITED STATES PATENT OFFICE.

SYDNEY W. TAYLOR, OF NEWPORT, RHODE ISLAND.

VELOCIPEDE.

SPECIFICATION forming part of Letters Patent No. 309,109, dated December 9, 1884.

Application filed May 31, 1884. (No model.)

*To all whom it may concern:*

Be it known that I, SYDNEY W. TAYLOR, a citizen of the United States, residing at Newport, in the county of Newport and State of Rhode Island, have invented certain new and useful Improvements in Velocipedes; and I do hereby declare the following to be a full, clear, and exact description of the invention, such as will enable others skilled in the art to which it appertains to make and use the same.

The object of my invention is to produce a velocipede which can stand alone, can be driven at nearly as great speed as a bicycle, with much less danger of the rider being thrown, and with the exertion of less power than is required to propel most velocipedes.

My velocipede is both safe and swift, and combines the advantages of a bicycle with those possessed by machines having a greater number of wheels.

The particular construction and arrangement of the various parts I will now proceed to point out and describe, reference being had to the accompanying drawings, in which—

Figure 1 is a perspective of a complete machine, and Fig. 2 a detail.

Referring to said drawings, A is the driving-wheel, provided with pedals similar to those of a bicycle.

$a\ a$ and $a'\ a'$ are parallel bars extending down on each side of the driving-wheel, forming a V-shaped frame or fork, B, in the lower point of which is journaled the axle of the driving-wheel.

$b\ b$ are cross-bars connecting the upper ends of the bars $a\ a$ and $a'\ a'$.

C is a saddle mounted on a spring, $c$, and is placed directly over the center of the driving-wheel. By this arrangement of the saddle the rider is enabled to utilize his entire weight in propelling the machine.

D D are two bars or tubes—one on each side of the driving-wheel—forming the main frame of the machine, to which the V frame or fork B is secured. Said bars D D are horizontal and parallel to each other from the center of the driving-wheel forward and backward until within a short distance of the circumference of said driving-wheel at the points $d\ d$, at which points said bars are bent down and diverge to either side, and are provided on their ends with sockets $d'\ d'\ d'\ d'$, which receive the spindles of the forks carrying the guiding-wheels, hereinafter described. The bars D D are connected at their lower ends, and prevented from spreading by the rods $d^2$. The V-shaped frame or fork B is fastened to the bars D D by clamping-rods E E and screws $e\ e$.

F F are the forward pair of guiding-wheels mounted in the forks $f\ f$, the spindles of said forks $f\ f$ being journaled in the forward sockets $d\ d$.

F' F' are the rear pair of guiding-wheels mounted in the forks $f'\ f'$, the spindles of said forks $f'\ f'$ being journaled in the rear sockets $d\ d$.

G is the steering-bar mounted in the bearing $g$. To the upper end of said steering-bar is rigidly secured the slotted crank or arm $g'$.

H is the handle-bar, and $h$ an arm rigidly secured thereto at right angles, and connects said handle-bar with the slotted crank $g'$ by means of a pin, $h'$, working in the slot in said crank $g'$.

$g^2$ is a slotted crank or arm secured to the lower end of the steering-bar.

I I are bell-crank levers fastened to the forks $f\ f$ of the forward pair of guiding-wheels, one arm of each of said levers extending in toward the opposite wheel, the other arms extending forward and parallel to each other, and are connected by the cross-rod $i$.

K is an arm fastened to or formed as a continuation of the right-hand lever I, and connects the same with the slotted crank or arm $g^2$ by a pin, $k$, working in the slot in said crank.

I' I' are bell-crank levers fastened to the forks of the rear pair of guiding-wheels, one arm of each lever extending out from the wheel, the other arms extending backward and parallel to each other, and are connected by the cross-rod $i'$, said rear set of levers, I' I', being arranged the reverse of the forward levers, I I.

$i^2\ i^2$ are rods connecting the forward and rear set of bell-crank levers, I I and I' I'.

It will now be readily seen that by turning the steering-bar in the desired direction the forward pair of guiding-wheels will be turned one way and the rear pair of guiding-wheels in the opposite direction, thus causing the machine to turn readily and quickly. By placing the seat directly over the center of the driving-wheel the rider is enabled to utilize his entire weight, and thus propel his machine with much less exertion than is required in riding most velocipedes; and the four guiding-wheels render my velocipede very safe, and make it almost impossible for the rider to be thrown backward or forward.

Having thus fully described my invention, I claim as new and desire to secure by Letters Patent—

1. In a velocipede, a main frame supported by a forward and rear pair of guiding-wheels, bell-crank levers secured to the forks of said guiding-wheels and connected by rods, in combination with a main driving-wheel and steering-gear adapted to turn the forward and rear pair of guiding-wheels simultaneously in opposite directions, substantially as shown and described.

2. In a velocipede, a main frame supported by a forward and rear pair of guiding-wheels, bell-crank levers secured to the forks of said guiding-wheels and connected by rods, in combination with a main driving-wheel, a saddle located directly over the center of said driving-wheel, and steering-gear adapted to turn the forward and rear set of guiding-wheels simultaneously in opposite directions, all arranged and operating substantially as shown and described.

3. In a velocipede, the bars D D, forward pair of guiding-wheels, F F, and rear pair of guiding-wheels, F' F', in combination with the V-frame B, driving-wheel A, and steering-gear adapted to turn the forward and rear pair of guiding-wheels simultaneously in opposite directions, substantially as shown and described.

4. In a velocipede, the bars D D, guiding-wheels F F and F' F', bell-crank levers I I and I' I', connecting-rods $i$ $i'$ and $i^2$ $i^2$, and arm K, in combination with the V-frame B, driving-wheel A, steering-bar G, cranks $g'$ and $g^2$, and handle-bar H, and arm $h$, all arranged and operating substantially as shown and described.

SYDNEY W. TAYLOR.

Witnesses:
R. P. STRONG,
A. B. TAYLOR.